Oct. 5, 1943.         S. F. WEYBREW         2,331,257
                      CONTROL SYSTEM
                   Filed Feb. 28, 1941
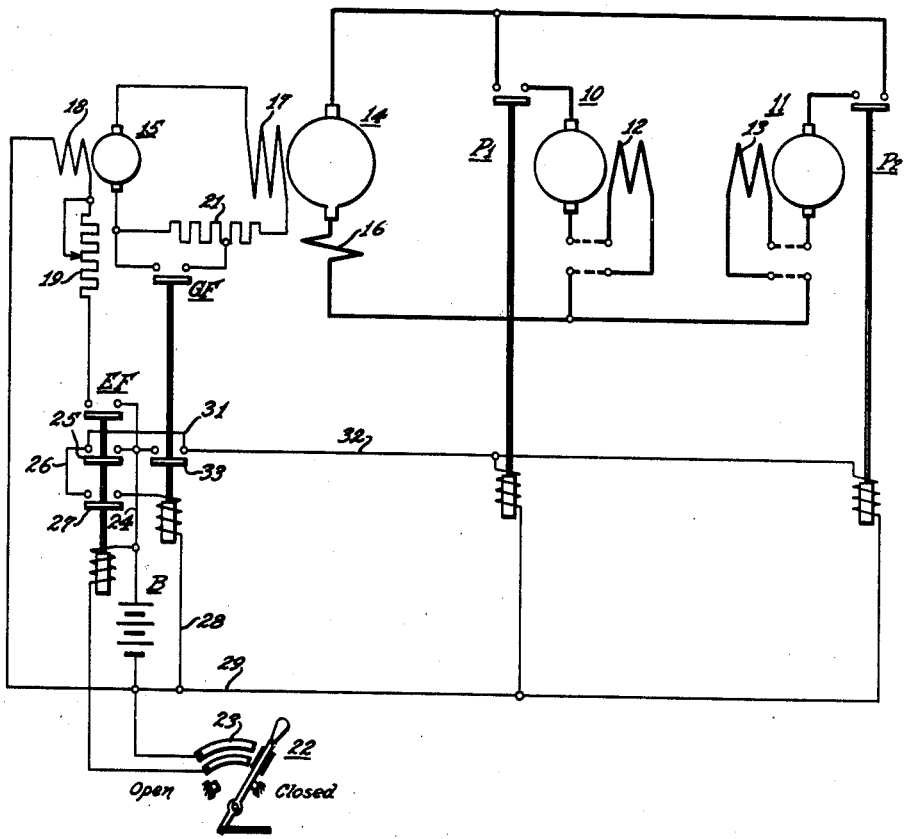
WITNESSES:                                INVENTOR
                                      Sydney F. Weybrew.
                                   BY
                                          ATTORNEY Patented Oct. 5, 1943

2,331,257

UNITED STATES PATENT OFFICE 2,331,257

CONTROL SYSTEM

Sydney F. Weybrew, Forest Hills, Pa., assignor to Westinghouse Electric & Manufacturing Company, East Pittsburgh, Pa., a corporation of Pennsylvania Application February 28, 1941, Serial No. 381,065

3 Claims. (Cl. 172—239)

My invention relates, generally, to control systems, and, more particularly, to control systems for self-propelled locomotives and the like.

The abrupt removal of the motor load from large generators on self-propelled locomotives frequently causes flashover of the generator commutators. The tendency to flashover results from the fact that at full load the generator main field and the commutating field are built up to a high value and the abrupt removal of load causes a momentary increase in the generator voltage. Also, the commutating field flux cannot decay instantaneously and, consequently, the commutating field is compensating for full load current after the load is removed and adds to the tendency to flash the commutator.

An object of my invention is to reduce the tendency of a generator to flashover.

Another object of my invention is to provide for gradually removing the motor load from the generator of a self-propelled locomotive.

A more general object of my invention is to provide a control system for a self-propelled locomotive which shall be simple and efficient in operation and which may be economically manufactured and installed.

Other objects of my invention will be explained fully hereinafter, or will be apparent to those skilled in the art.

In accordance with one embodiment of my invention, the instantaneous removal of the motor load from the generator of a Diesel-electric locomotive is prevented by so interlocking the load contactors and the means for controlling the excitation of the generator that the load switches or contactors cannot open until after the generator excitation has been reduced, thereby permitting the generator field flux to decay sufficiently to reduce the tendency to flash the commutator of the generator.

For a fuller understanding of the nature and objects of my invention, reference may be had to the following detailed description, taken in conjunction with the accompanying drawing, in which the single figure is a diagrammatic view of a control system embodying my invention.

Referring to the drawing, the system shown therein comprises a pair of traction motors 10 and 11 having series field windings 12 and 13, respectively, a generator 14 for supplying current to the motors 10 and 11, and an exciter 15 for exciting the generator 14. The generator 14 is provided with a commutating field winding 16 and a separately excited field winding 17 which is energized by the exciter 15. The exciter 15 is provided with a field winding 18 which may be energized from a battery B. An adjustable resistor 19 is provided in the circuit for the field winding 18, thereby permitting adjustment of the exciter voltage. A resistor 21 is provided in the circuit for the field winding 17 of the generator 14. A portion of the resistor 21 is shunted from the field winding circuit when a switch GF is closed, thereby varying the excitation of the generator 14. A switch EF is provided for controlling the energization of the field winding 18 of the exciter 15 from the battery B.

In accordance with the usual practice, switches P1 and P2 are provided for connecting the motors 10 and 11, respectively, to the generator 14. A manually-operated throttle 22 is provided for controlling the supply of fuel to the engine (not shown) which drives the generator 14 and the exciter 15 in the usual manner on self-propelled locomotives. The throttle 22 is provided with contact members 23 which control the operation of the switch EF, as will be more fully described hereinafter.

In prior control systems, the method of shutting off power on a locomotive of the type herein described has been to open the circuit to the P1, P2, GF, and EF switches simultaneously by opening the throttle switch at the time of closing the throttle to reduce the engine to idling speed. The opening of the P1 and P2 switches simultaneously with or before the opening of the GF and EF switches would remove all the load from the generator before its field was reduced, thereby resulting in flashover of the generator commutator, as explained hereinbefore.

In order to prevent removal of the motor load from the generator until after the field is reduced, interlocks are provided on the switches GF and EF for so controlling the operation of the switches P1 and P2 that the motors are not disconnected from the generator until after the operation of the switches EF and GF to reduce the excitation of the generator. In this manner the load is not removed from the generator until the generator field flux is sufficiently reduced to prevent the generator from developing sufficient voltage to cause flashover of the generator commutator.

In order that the functioning of the foregoing apparatus may be more clearly understood, the operation of the system will now be described in more detail. Assuming that the engine has been started in the usual manner, the locomotive may be put into operation by opening the throttle 22, thereby closing the switch EF to energize the field winding 18 of the exciter 15. The actuating coil of the switch EF is connected across the battery B through the contact members 23 of the throttle switch at all times, except when the throttle handle is in the closed position. Therefore, the switch EF is closed at this time to connect the field winding 18 across the battery B.

The closing of the switch EF energizes the actuating coils for the switches GF, P1, and P2. The energizing circuit for the coil of the switch GF may be traced from the positive terminal of the battery B through conductor 24, an interlock 25 on the switch EF, conductor 26, another interlock 27 on the switch EF, the actuating coil of the switch GF, and conductors 28 and 29 to the negative terminal of the battery B. The energizing circuit for the switches P1 and P2 extends from the conductor 26 through conductors 31 and 32, the actuating coils of the switches P1 and P2 and the conductor 29 to the negative terminal of the battery B. In this manner the switch GF is closed to shunt a portion of the resistor 21 from the circuit for the field winding 17 to increase the voltage of the generator 14, and the switches P1 and P2 are closed to connect the motors 10 and 11 across the generator 14.

When it is desired to shut off the power on the locomotive, the throttle 22 is moved to the closed position to reduce the engine to idling speed. The closing of the throttle 22 opens the throttle switch 23, thereby deenergizing the actuating coil of the switch EF and opening this switch to reduce the exciter voltage.

Following the opening of the switch EF, the switch GF is opened by the opening of the interlock 27 on the switch EF, thereby further reducing the generator voltage. The switches P1 and P2 remain closed until the switch GF is opened since their actuating coils are kept energized through an interlock 33 on the switch GF. As shown, the interlock is connected in parallel-circuit relation with the interlock 25 on the switch EF. Therefore, the opening of the switch EF does not deenergize the actuating coils of the switches P1 and P2 which remain closed until the switch GF is opened. In this manner, a short time delay in the opening of the switches P1 and P2 is provided. While the time delay is relatively short, it has been found to be of sufficient duration to prevent flashover of the generator commutator, as explained hereinbefore.

From the foregoing description, it is apparent that I have provided a control system which reduces the tendency of a generator to flashover as a result of the removal of load from the generator while it is fully excited. Furthermore, the present system is simple in operation, and may be provided on a locomotive by the addition of a small amount of equipment to the apparatus usually installed on Diesel-electric or other self-propelled locomotives.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system, in combination, a motor, a generator for supplying current to the motor, an exciter for the generator, control means for controlling the excitation of said exciter, switching means for controlling the energization of said control means, additional control means for varying the generator excitation, additional switching means for controlling the operation of said additional control means, a switch for connecting the motor to the generator, and auxiliary contact members actuated by said switching means in sequential relation for jointly controlling the operation of said switch.

2. In a control system, in combination, a motor, a generator for supplying current to the motor, an exciter for the generator, switching means for connecting the motor to the generator, a switch for controlling the excitation of the exciter, an additional switch for controlling the excitation of the generator, auxiliary contact means on said switches causing them to be operated in sequential relation, and additional auxiliary contact means on said switches for controlling the operation of said switching means.

3. In a control system, in combination, a motor, a generator for supplying current to the motor, an exciter for the generator, switching means for connecting the motor to the generator, a switch for controlling the excitation of the exciter, an additional switch for controlling the excitation of the generator, auxiliary contact means on said switches causing them to be operated in sequential relation, and additional auxiliary contact means on said switches requiring that both switches be operated before the opening of said switching means to disconnect the motor from the generator.

SYDNEY F. WEYBREW.